(12) United States Patent
Kulkarni et al.

(10) Patent No.: US 10,510,374 B2
(45) Date of Patent: Dec. 17, 2019

(54) SELF-HEALING IN A STORAGE SYSTEM

(71) Applicant: Seagate Technology LLC, Cupertino, CA (US)

(72) Inventors: Ajay Narayan Kulkarni, Longmont, CO (US); Timothy R. Feldman, Louisville, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 132 days.

(21) Appl. No.: 15/642,159

(22) Filed: Jul. 5, 2017

(65) Prior Publication Data
US 2019/0013046 A1 Jan. 10, 2019

(51) Int. Cl.
| | | |
|---|---|---|
| *G06F 11/00* | (2006.01) | |
| *G11B 20/18* | (2006.01) | |
| *G06F 12/10* | (2016.01) | |
| *G11B 20/12* | (2006.01) | |
| *G06F 3/06* | (2006.01) | |
| *G06F 11/22* | (2006.01) | |

(52) U.S. Cl.
CPC ........ *G11B 20/1889* (2013.01); *G06F 3/0611* (2013.01); *G06F 3/0634* (2013.01); *G06F 3/0685* (2013.01); *G06F 11/22* (2013.01); *G06F 12/10* (2013.01); *G11B 20/1217* (2013.01); *G06F 2212/1032* (2013.01); *G11B 2020/1238* (2013.01)

(58) Field of Classification Search
CPC .... G06F 3/0611; G06F 3/0634; G06F 3/0685; G06F 11/0727; G11B 20/1217; G11B 20/1889
See application file for complete search history.

(56) References Cited

U.S. PATENT DOCUMENTS

| | | |
|---|---|---|
| 9,128,820 B1 | 9/2015 | Malina |
| 9,424,879 B1* | 8/2016 | Li ................... G11B 20/1217 |
| 10,140,067 B1* | 11/2018 | Horn ...................... G06F 3/0685 |
| 2015/0254144 A1* | 9/2015 | Pantel ................ G11B 20/1252 360/48 |
| 2016/0012850 A1 | 1/2016 | Feldman |
| 2016/0148626 A1 | 5/2016 | Rausch et al. |
| 2016/0148644 A1* | 5/2016 | Zhu ..................... G11B 20/1217 360/48 |
| 2017/0011769 A1* | 1/2017 | Shang ................ G11B 20/1816 |
| 2017/0090763 A1* | 3/2017 | Horn ...................... G06F 3/0604 |
| 2017/0090775 A1* | 3/2017 | Kowles ................ G06F 3/0608 |
| 2017/0090776 A1* | 3/2017 | Kowles ................ G06F 3/0608 |

* cited by examiner

*Primary Examiner* — Joshua P Lottich
(74) *Attorney, Agent, or Firm* — Holzer Patel Drennan

(57) ABSTRACT

A storage system such as a hard disc drive (HDD), solid-state drive (SSD), hybrid drive (SSHD), storage rack, set of storage racks, JBOD, array of discs, etc. may include a variety of storage media. Failures may be detected in the storage media of the storage system. Such a failure may affect the physical capacity of the storage system. A storage controller of the storage system initiates a media conversion that converts a portion of the storage media from media storing data according to a first recording scheme to a media storing data according to a second recording scheme. The second recording scheme stores data at a higher density compared to the first recording scheme.

20 Claims, 10 Drawing Sheets

SELF-HEALING IN A STORAGE SYSTEM

BACKGROUND

Storage systems may include a variety of storage devices and storage media including hard disc drives (HDDs), solid-state drives (SSDs), hybrid drives (e.g., SSHDs), and combinations thereof. Defects or failures may occur in the storage system. To repair the storage system, discs, one or more HDDs, or SSDs, etc. may have to be replaced or the system may have reduced storage capacity and/or performance, which can be costly to a consumer, manufacturer, etc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

In at least one implementation, a method includes detecting a defect in a storage system causing a loss in physical storage capacity of the storage system, the storage system including a storage media storing data according to a first recording scheme; and responsive to detecting the defect, converting at least a portion of the storage media to a second recording scheme, the second recording scheme storing data at a substantially higher storage density than a storage density of the first recording scheme.

These and various other features and advantages will be apparent from a reading of the following Detailed Description.

BRIEF DESCRIPTIONS OF THE DRAWINGS

DETAILED DESCRIPTION

Figure 1:
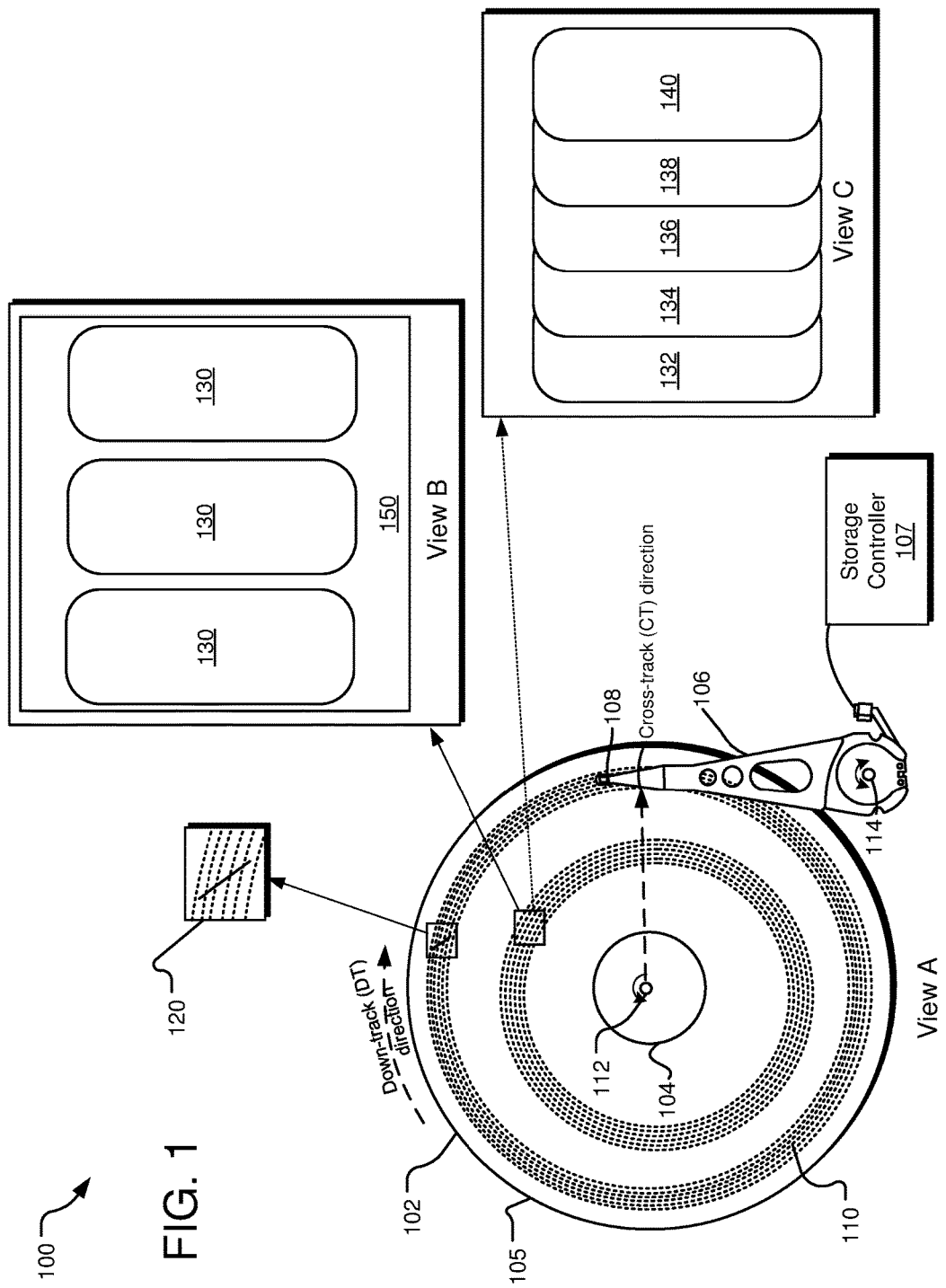
FIG. 1 illustrates an example storage system configured for self-healing.

Storage systems may include a single disc, a number of discs, flash storage, etc. as storage media. The storage media may be expressed in one or more devices (e.g., hard disc drives (HDDs) or solid-state drives (SSDs)) or a number of HDDs and/or SSDs, a JBOD, a storage rack, set of storage racks, etc. A failure or defect in one or more storage media of such a storage system may compromise the capacity of the storage system. Instead of replacing the failed/defected media or device housing the failed/defected media, implementations described herein provide for self-healing in a storage system that substantially maintains the storage system capacity and/or performance without replacing media or devices. Such self-healing may include selecting at least a portion of the storage media (e.g., a non-defected portion of the defected medium or another storage medium or media) to convert from a first recording scheme to a second recording scheme. The second recording scheme stores data at a substantially higher density than the first recording scheme. For example, if the defected/failed medium is a portion of a single disc, then another portion of the disc may be converted from a conventional magnetic recording (CMR) scheme to shingled magnetic recording (SMR) scheme. Such conversion may maintain a logical capacity of the storage device presented to the host. In large or high capacity storage systems, the media conversion may be spread across multiple devices/medias such as to maintain performance standards.

Selection of media to convert may depend on one or more factors including, without limitation, latency of data, type of data, read/write heat, location of data, amount of media needed to convert, etc. As such, the storage device can select appropriate media to convert while substantially maintaining logical capacity and/or performance parity. Furthermore, conversion operations may utilize media or a portion of the media in one or more storage media as a cache to stage the conversion. The cache may also be utilized to absorb random writes to a converted media after the media is converted such as to maintain write performance.

Logical block address (LBA) mapping schemes may be utilized to monitor and track media conversion for self-healing. For example, some implementations may utilize two LBA mapping schemes. One LBA mapping scheme may correspond to a mapping when the storage media stores data according to the first recording scheme. The other LBA mapping scheme may correspond to a mapping when the storage media stores data according to the second recording scheme. As such, after the media is converted, the other LBA mapping scheme may be utilized to track and direct reads/writes to the converted media.

Such implementations may be utilized to delay or avoid replacement of media and/or devices in storage systems, which is a value proposition in data centers or other organizations in a total cost of ownership (TCO) viewpoint. Furthermore, reliability and longevity of such storage systems is increased. The above described implementations and other implementations are described further below with respect to the figures.

The storage system may have FIG. 1 illustrates an example storage system 100 configured for self-healing. Specifically, FIG. 1 illustrates the storage system 100 as a disc drive assembly. The storage system includes 100 a transducer head 108 with a writer and reader. The transducer head 108 may include a number of read and write configurations such as heat-assisted magnetic recording (HAMR), multiple read and/or write heads, etc. Although other implementations are contemplated, the storage system 100 includes a magnetic storage medium 102 as a magnetic disc on which data bits can be recorded using a magnetic write pole and from which data bits can be read using a magnetoresistive element (not shown). As illustrated in view A, the magnetic storage medium 102 is a magnetic storage disc that rotates about a spindle center or disc axis of rotation 112. The magnetic storage medium 102 includes an inner diameter 104 and an outer diameter 105 between which are a number of concentric data tracks 110. Information may be written to and read from data bit locations in the concentric data tracks 110 on the magnetic storage medium 102. The magnetic storage medium 102 may include a number of servo sectors (not shown) for head storing head position information. The magnetic storage medium 102 may further include parity sectors providing error correction code.

The transducer head 108 is mounted on an actuator assembly 106 at an end distal to an actuator axis of rotation 114. The transducer head 108 flies in close proximity above a surface of the magnetic storage medium 102 during disc rotation. The actuator assembly 106 rotates during a seek operation about the actuator axis of rotation 114. The seek operation positions the transducer head 108 over a target data track for read and write operations.

The storage system 100 further includes a storage controller 107. The storage controller 107 includes software and/or hardware and may be implemented in any tangible processor-readable storage medium within or communicatively coupled to the storage system 100. "Tangible processor-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by a processor, however, tangible processor-readable storage media excludes any transitory storage media. In contrast to tangible processor-readable storage media, intangible processor readable communication signals may embody processor readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

The concentric data tracks 110 may be written to the magnetic storage medium 102 using a conventional magnetic recording (CMR) scheme, as illustrated in view B. In view B, a band 150 of data tracks 130 are written to the magnetic storage medium 102. The data tracks 130 include a plurality of polarized regions (not shown), also referred to as "data bits," each representing one or more individual track bits of the same state (e.g., 1s or 0s). Each track in a CMR band is randomly writable, meaning that any data track 130 may be rewritten without significantly affecting an adjacent data track. It should be understood that the band 150 of the data tracks 130 is for illustrative purposes that an example band may include more than three tracks.

A host device (not shown) may be communicatively coupled to the storage system 100 and may direct reads and writes to logical block addresses (LBAs) (not shown) that represent the logical storage capacity of the storage system 100. The LBAs may be managed by the storage controller 107 or by a host device connected to the storage system 100. If the capacity of the storage system 100 is 1 TB, for example, then the range of LBAs are usable to address host data to different portions of the 1 TB space. In the illustrated implementation, a defect 120 is detected on the surface of the magnetic storage medium 102. The illustrated defect 120 is a scratch, but it should be understood that other defects may be detected. The defect 120 compromises the storage capacity of the storage system 100. Specifically, the defect 120 renders a number of concentric data tracks 110 unusable to store data. As such, the storage system 100 may not be usable to store 1 TB of data, as represented by the LBAs.

Defects may be detected because of one or more unreadable sectors, a number of unreadable sectors above a threshold, noisy data, etc. Furthermore, after detecting unrecoverable data or another issue, the storage controller 107 may direct the device to perform a self-test. The self-test may reveal the failure domain (e.g., location of defect/failure) on a storage medium (e.g., the magnetic storage medium 102). The domain may be on all sectors of a surface, sectors at a radial stroke of the actuator assembly 106, all sectors of a track, a band of tracks, a disc surface (e.g., one side of a disc), a platter, blocks of a flash (see FIG. 6), etc.

To rectify for the lost capacity due to the detected defect 120, the storage system 100 (e.g., via the storage controller 107) may initiate a data rewrite on the magnetic storage medium 102. In the illustrated implementations, the band of data tracks 130 of view B may be rewritten using an enhanced capacity recording scheme as illustrated in view C. Specifically, view C illustrates data tracks 132, 134, 136, 138, and 140 written using a shingled magnetic recording scheme (SMR). The data tracks 132-140 are written in order from 132 to 140 in an overlapping manner, which acts to increase the number of tracks written per radial inch of the magnetic storage medium 102. Because there are more tracks written per radial inch (in view C), the capacity of the magnetic storage medium 102 may be increased to account for the defect 120.

Thus, when a defect, such as the defect 120, is detected on a storage medium (e.g., the magnetic storage medium 102) that affects the logical storage capacity of a storage system (e.g., the storage system 100), another portion of the storage medium (or another storage medium) may be selected for media conversion to a enhanced capacity recording scheme to maintain the storage capacity. Selection of a storage medium (or a portion of a storage medium) to convert to the enhanced capacity scheme may be based on a number of factors including, without limitation, latency of data, read heat, write heat, type of data, location, etc. In one example, a band of data tracks near the inner diameter 104 of the magnetic storage medium 102 may not be ideal for conversion because such a conversion may not increase the capacity enough to maintain the logical capacity (e.g., because tracks near the inner diameter 104 have a lower capacity compared to data tracks closer to the outer diameter 105). In another implementation, the data tracks at mid-stroke or zero-skew (e.g., of the write head) may be selected for conversion because such tracks may hold more data. These and other selection criterion are discussed below with respect to FIG. 4.

A cache may be used when converting (e.g., rewrite) a storage medium or a portion thereof from a conventional recording scheme to a high capacity recording scheme (e.g., SMR). For example, data tracks 130 of view B may be read from the magnetic storage medium 102, written to a cache, then rewritten to the magnetic storage medium 102 using the enhanced capacity recording scheme, as illustrated by the data tracks 132-140 in View C. The cache may be a flash (not shown) or other non-volatile medium of the storage system or may be a portion of the magnetic storage medium 102, such as a media cache (not shown) or other volatile cache.

The cache used to convert and move data of the storage media may be a media cache (media designated for over provisioning) or a portion thereof. For example, an 8 TB HDD may include a 50 GB media cache. If 100 GB of the 8 TB HDD is to be converted from CMR to SMR, 5 GB of the 50 GB media cache may be used as a "staging area" for conversion. Furthermore, the 5 GB of the 50 GB media cache may also be used to absorb write accesses to the converted media to maintain performance. However, if read/write commands increase for the converted media and harms performance, the portion of the media cache used for write command absorption may be increased. Furthermore, the portion of the media cache used during conversion may be increased as more media is selected for conversion. Such implementations provide a balance between performance and over provisioning.

Furthermore, media conversion to a high capacity recording scheme requires remapping of LBA space. Such remapping may be realized by the storage controller 107 or the host device. In some implementations, multiple LBA ranges may be used to map the storage capacity, with different LBA ranges associated with different recording schemes. For example, a first LBA range may be used to map data to the magnetic storage medium 102 when the data is recorded using a conventional recording scheme. A second LBA range may be used to map data to the magnetic storage medium 102 when the data is recorded using the enhanced capacity recording scheme.

FIG. 1 is illustrated using SMR as the enhanced capacity recording scheme (e.g., view C), but it should be understood that other enhanced capacity recording schemes may be used. For example, interlaced magnetic recording (IMR) may be utilized as the enhanced capacity recording scheme to account for detected defects in the magnetic storage medium 102.

Figure 2:
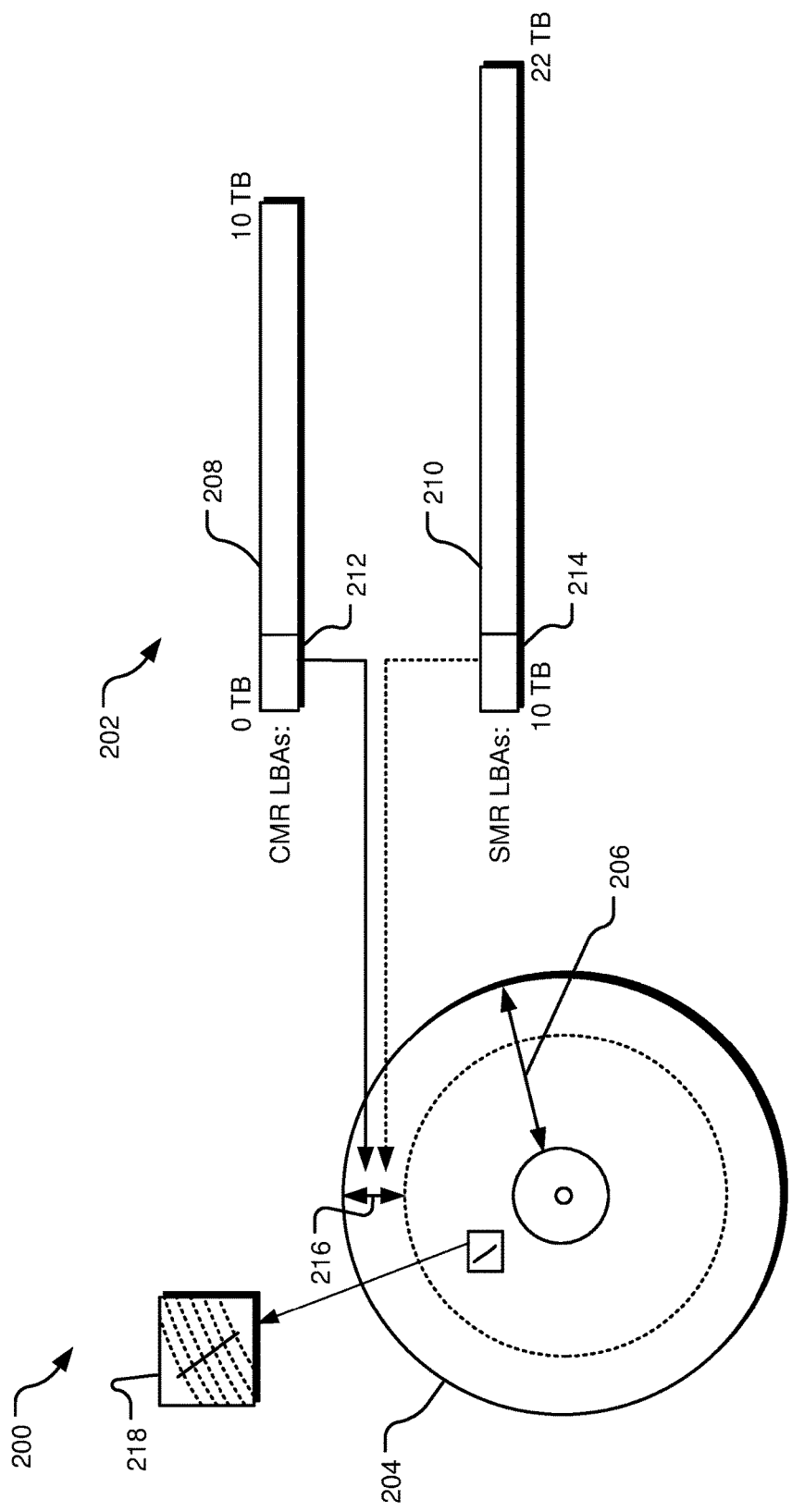
FIG. 2 illustrates an example mapping scheme for a storage system configured for self-healing.

FIG. 2 illustrates an example mapping scheme 202 for a storage system 200 configured for self-healing. The storage system 200 includes a magnetic storage medium 204 with a storage capacity 206. The storage capacity 206 is initially mapped using a set of conventional magnetic recording (CMR) logical block addresses (LBAs) ("CMR LBAs 208"). When the magnetic storage medium 204 stores data according to a conventional recording scheme, the storage capacity 206 is 10 TB, which is reflected in the range of CMR LBAs 208 (0 TB-10 TB). It should be understood that the designated capacities are for illustrative purposes, and that other storage capacities may be similarly mapped. When the magnetic storage medium 204 stores data according to an enhanced capacity recording scheme, such as shingled magnetic recording (SMR), then the magnetic storage medium may store up to 12 TB of data, which is reflected in SMR LBAs 210 (10 TB-22 TB). Thus, the mapping scheme 202 includes a range of LBAs for the storage capacity 206 when storing data using a conventional recording scheme (e.g., CMR LBAs 208) and a range of LBAs for the storage capacity 206 when storing data according to an enhanced capacity recording scheme (e.g., SMR LBAs 210). In other words, there are 10 TB worth of CMR LBAs and 12 TB worth of SMR LBAs.

In the illustrated mapping scheme 202, a range of LBAs in the CMR LBAs 208 and a range of LBAs in the SMR LBAs 210 may be assigned the same piece of media. For example, a range 212 of the CMR LBAs 208 and a range 214 of the SMR LBAs are both assigned to a portion 216 of the storage medium 204. When the portion 216 is written to, the host (or storage manager) may designate either the range 212 or the range 214. Thus, initially the host (or storage manager, etc.) may write to the range 212 and the data is written to the portion 216 using the conventional recording scheme. However, when a defect is detected (e.g., a defect 218) in the magnetic storage medium 204 that affects the storage capacity 206, the portion may be converted to SMR. When the portion 216 is converted, the range 214 is used to write (or read) data to the portion 216.

Figure 5:
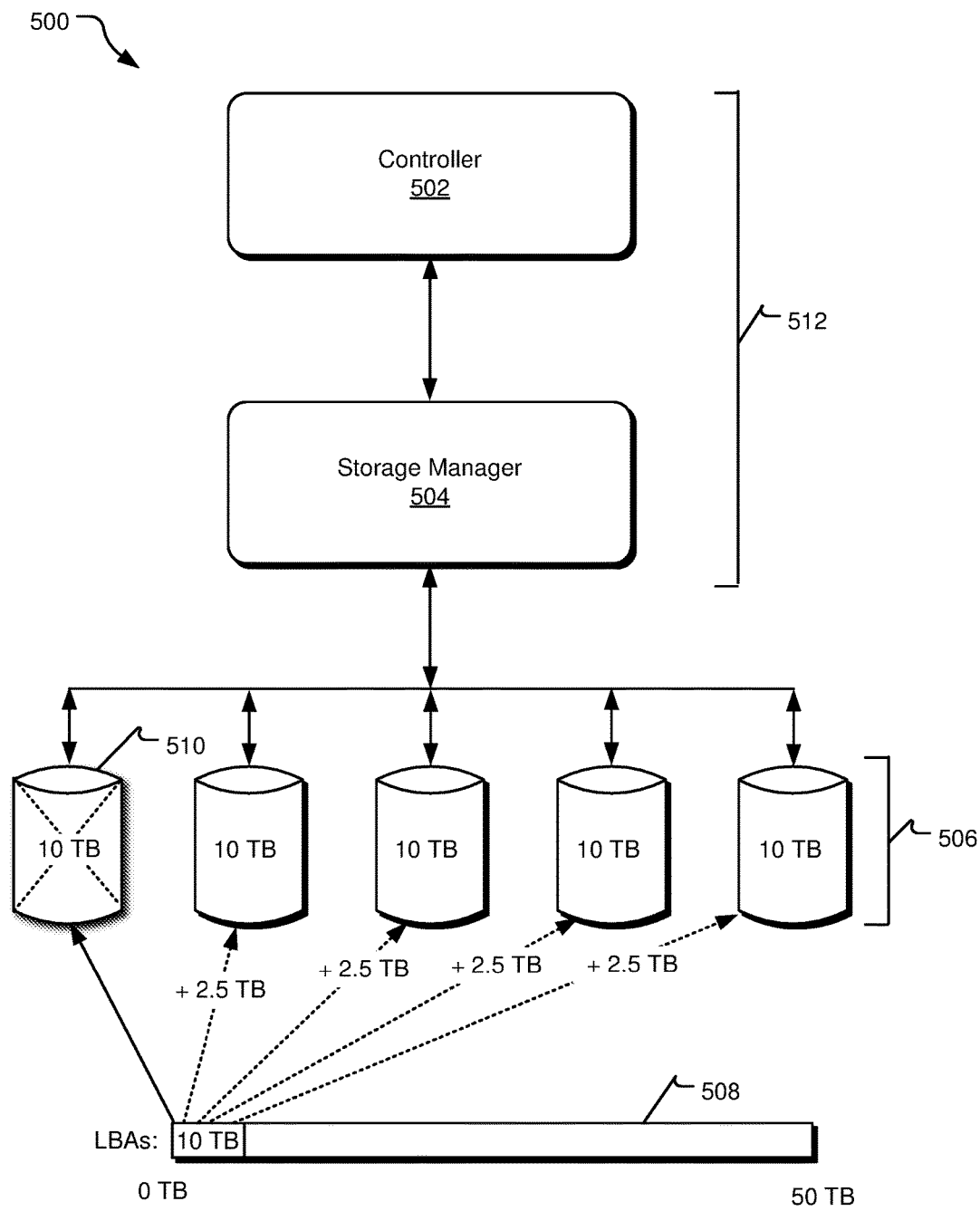
FIG. 5 illustrates another example storage system configured for self-healing.

The mapping scheme 202 allows for a fine-grained conversion of the magnetic storage medium. A subset of the CMR LBAs 208 that correspond to a subset of SMR LBAs may be selected for conversion. When selecting a subset of LBAs for conversion, the host (or storage manager, storage controller, etc.) may utilize a number of factors including, without limitation, latency of data, read heat, write heat, type of data, location, etc. Such information may be stored in a heat map, flash translation layer, etc. which are managed by a storage controller or host device. It should be understood that interlaced magnetic recording (IMR) or another enhanced capacity recording scheme may be utilized with the mapping scheme 202 illustrated in FIG. 2. It should also be understood that the mapping scheme illustrated in FIG. 2 may be used to map storage media include one or more disc surfaces (e.g., a HDD including a platter of discs), one or more storage devices (e.g., a storage system as illustrated in FIG. 5), etc. Furthermore, the mapping scheme 202 may be utilized for a storage media storing data according to two or more recording schemes without regard to defect detection or self-healing. It is contemplated that three or more LBA ranges may be utilized to map storage media storing data according to three or more recording schemes.

Figure 3:
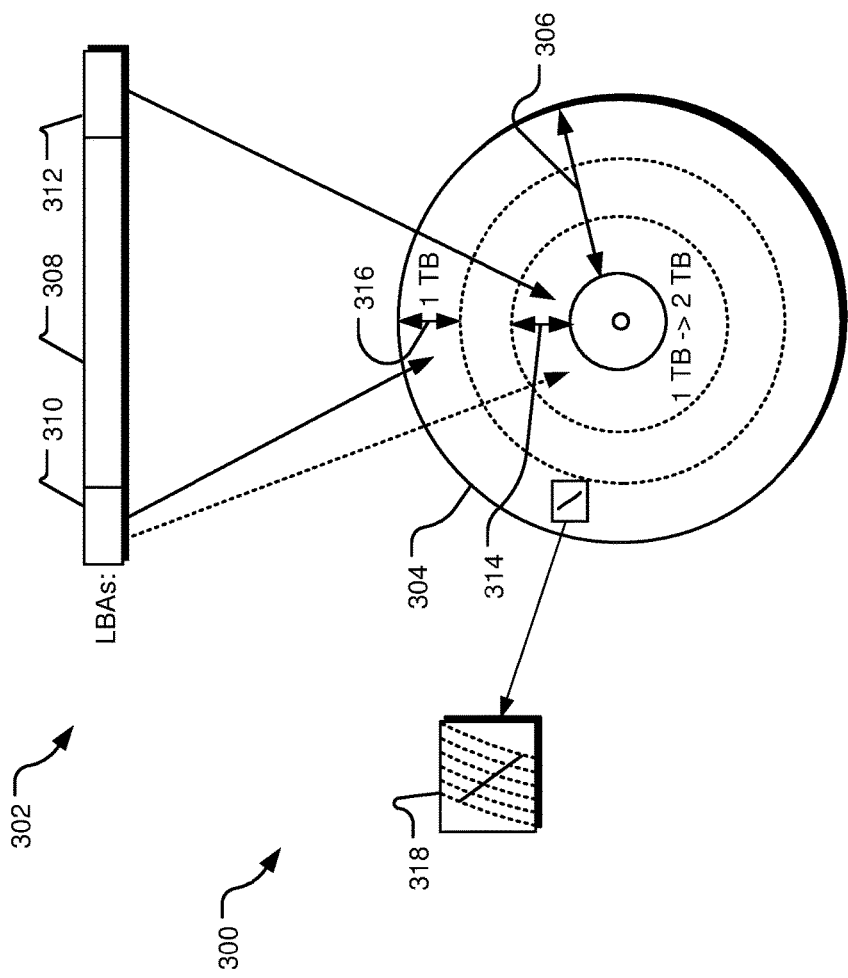
FIG. 3 illustrates another example mapping scheme for a storage system configured for self-healing.

FIG. 3 illustrates another example mapping scheme 302 for a storage system 300 configured for self-healing. The storage system 300 includes a magnetic storage medium 304 with a storage capacity 306. The storage capacity 306 is initially mapped using the logical block addresses (LBAs) 308 and using a conventional magnetic recording (CMR) scheme. A first range 310 of the LBAs 308 is initially mapped to a first portion 316 of the magnetic storage medium 304. A second range 312 is mapped to a second portion 314 of the storage medium 304. A defect 318 is detected on the magnetic storage medium 304. The defect 318 compromises the storage capacity 306. Specifically, a band of data tracks on the first portion 316 of the magnetic storage medium 304 are unusable to store data due to the defect, thus causing a loss in the storage capacity 306. In the illustrated example, the first portion 316 held (and the first range 310 of the LBAs 308 corresponded to) 1 TB of data. In response, a host device or storage manager/controller (not shown) selects the second portion 314 to convert to enhanced capacity recording scheme section such as shingled magnetic recording (SMR). The second portion 314, when written using a conventional recording scheme stores, for example, 1 TB of data, but when converted to an SMR portion stores 2 TB of data to account for the 1 TB of data loss in the first portion 316. It should be understood that such capacities are for illustrative purposes. Before the second portion 314 is converted to the enhanced capacity recording scheme, data corresponding to the second range 312 of LBA blocks is read to a cache (not shown) then written back to the second portion 314 using the enhanced capacity recording scheme.

If data is readable in the first portion 316, the data may be read to a cache then rewritten to the second portion 314 or another location on the magnetic storage medium 304. Furthermore, the first range 310 of the LBAs 308 that was associated with the first portion 316 may be remapped to the second portion 314, which has been converted to an enhanced capacity recording section. Because the second portion 314 is converted to an SMR portion, the storage capacity 306 represented by the LBAs 308 is maintained. In some circumstances, data on the defective media may not be readable, in whole or in part.

Some example devices utilize zoned block scheme for LBA space for media storing data according to a SMR scheme. In such implementations, LBA space is divided into independent zones. For example, the first range 310 of LBA corresponds to one or more zones and the second range 312 corresponds to a different one or more zones. After the second portion 314 of the storage media is converted to the enhanced capacity scheme, the first range 310 of LBAs and/or the second range 312 LBAs may transition to an unwritten state such as an "empty" state.

Figure 4:
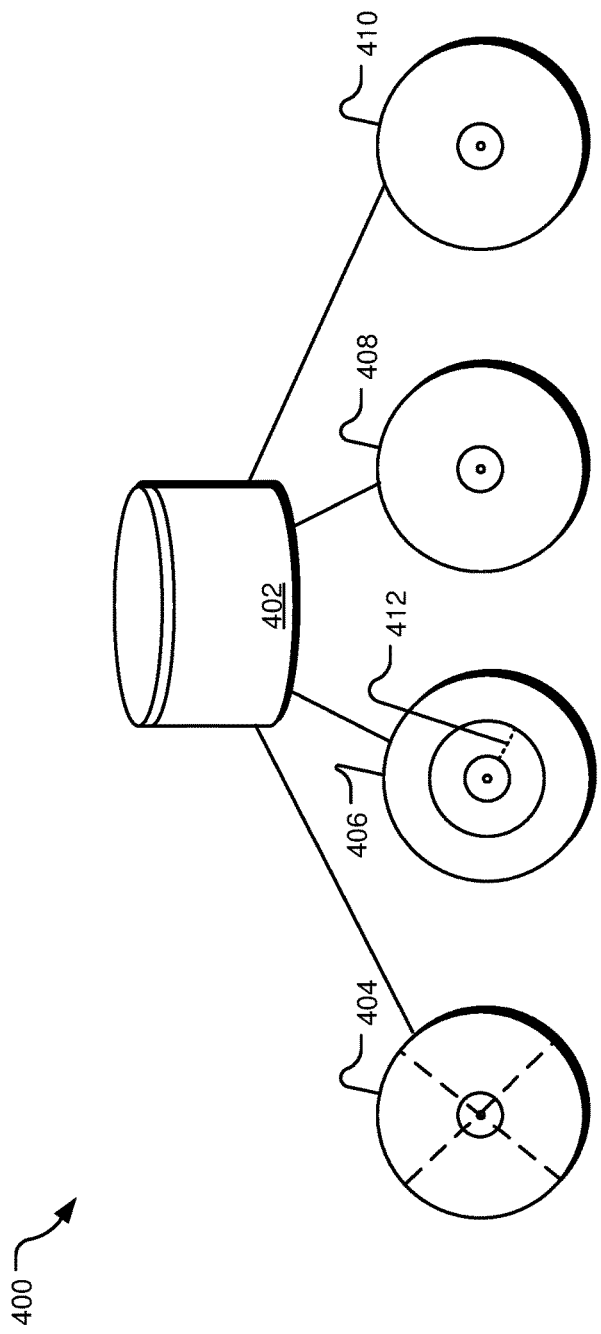
FIG. 4 illustrates another example storage system configured for self-healing.

FIG. 4 illustrates another example storage system 400 configured for self-healing. Specifically, FIG. 4 illustrates self-healing in a disc drive 402 including a plurality (e.g., platter) of discs (e.g., a disc 404, 406, 408, and 410). The illustrated failure domain is disc 404, meaning that the entire disc 404 or a surface (e.g., bottom or top surface) of the disc 404 is defective. To accommodate the lost capacity in the disc drive 402, a portion of the remaining discs (e.g., the discs 406, 408, and 410) are converted to an enhanced capacity recording scheme (e.g., SMR). For example, a portion 412 of the disc 406 is converted to SMR. Portions of the disc 408 and 410 are similarly converted to SMR to provide the lost capacity. The LBA mapping schemes described above with respect to FIG. 2 and FIG. 3 may be similarly utilized to map the self-healing storage system 400.

FIG. 5 illustrates another example storage system 500 configured for self-healing. In FIG. 5, the storage system 500 is a datastore such as a JBOD, array of discs, server, storage rack, a set of racks, or any other predefined storage capacity presented to host controller (not shown) as a storage unit or a storage ecosystem. Specifically, FIG. 5 illustrates self-healing, as described in FIGS. 1-3 across a plurality of storage mediums and storage devices (e.g., storage devices 506). The storage devices 506 may include a number of disc arrays, hard disc drives, SSDs, etc. Each of the storage devices 506 may include a respective storage controller, flash or other non-volatile cache, volatile cache, etc.

The storage system 500 includes a software/hardware stack 512 that includes a storage controller 502 and a storage manager 504. The storage manager 504 is an active system which monitors data track and drive health to make drive state recommendations to the storage controller 502 upstream or initiate a conversion process unilaterally. In implementations, the storage manager 504 manages logical block addresses (LBAs) of the storage capacity and manages mappings of LBAs to physical space before, during, and after media conversion. The remapping of LBA space may be hidden from the storage controller 502 or the storage controller 502 may hide the mapping from a host device (not shown).

In the illustrated implementation, a capacity of the storage system is represented by logical block addresses (LBAs) 508 aggregated by a RAID controller or a logical volume manager, for example. The storage system holds 50 TB of data, as represented by the LBAs 508. As such, each of the storage devices 506 may hold 10 TB of data, when storing data according to a conventional recording method. 10 TB of the 50 TB is mapped to a storage device 510, as illustrated in the LBAs 508. However, a defect or failure is detected in the storage device 510, and media for 10 TB of capacity originally mapped to the storage device 510 is lost. The storage manager 504 or storage controller 502 selects a portion of each of the remaining storage devices 506 to convert to an enhanced capacity recording scheme such as SMR. Thus, the 10 TB of lost capacity may be realized across multiple devices. In the illustrated implementation, 2.5 TB of additional capacity is provisioned to each of the remaining storage devices 506, which have portions converted to the enhanced capacity recording scheme to provide the additional 2.5 TB of capacity. Spreading the lost capacity across a number of different drives generally avoids performance issues that may be present when utilizing fewer drives to account for lost capacity. This notion is better understood with respect to a storage system that includes, for example, 100 storage devices. If one storage device of the 100 storage devices fails, then 1% of the storage capacity is lost (assuming all 100 devices are the same size, but it should be understood that in some implementations, the devices are not all the same size). The other 99 storage devices may be used to account for 1/99th of the lost capacity (e.g., 1/99th of the 1% capacity loss). Thus, a small portion of each of the 99 storage devices is converted to an enhanced capacity recording scheme to provide the additional capacity. Thus, a performance hit for conversion may not be (or may barely be) visible to a host. In other words, performance parity after a drive failure may be substantially maintained.

In some implementation, each of the storage devices 506 is represented by a separate LBA space. In such implementations, the LBA space for each device that has media converted may be remapped as described above with respect to FIGS. 2-4. It should be understood that other storage standards are contemplated. For example, in a small computer system interface (SCSI) device, the LBA space for each device is a separate logical unit number (LUN) or target.

In some implementations, a subset of the remaining storage devices 506 (instead of all remaining drives) may be selected to convert (e.g., partially) to an enhanced capacity recording scheme. The selection of storage devices to convert may depend on a number of factors including, without limitation, latency of data, read heat, write heat, type of data, location, etc. For example, if a storage device has a high read heat but a low write heat, then such a storage device may be ideal for converting to an SMR media since data tracks of an SMR media are randomly readable but not randomly writable. In contrast, a device that has a high write heat may not be ideal for conversion since writing to an SMR medium has a higher performance cost. As such, 5 TB of the 10 TB of logical space lost in FIG. 5 may be provisioned to a single remaining storage device while 2.5 TB of lost capacity may be provisioned two of the other remaining storage device. One of the remaining storage devices may not be converted. Other distributions are contemplated.

For selection of devices for conversion based on command latency, a latency metric may be utilized. For example, each storage device 506 may have a command latency associated described by a cumulative distribution function (cdf). A percentage threshold may be used to determine which drives to select for conversion. Each drive may be scored at 99% of the cdf (e.g., determine what is the command response time for 99% of the commands to each drive). For example, a storage device A may have a 99% command response time of 120 ms, a storage device B may have a 99% command response time of 80 ms, and storage device C may have a command response time of 100 ms. The storage devices with the faster latency are able to accommodate more requests and the resulting impact on latency and are thus selected for conversion. Accordingly, storage devices B and C in the above example may be selected for conversion. The selection of media for conversion may also account for predicted future latency. In the above described example, a predicted future latency for each of the storage device A, B, and C may be determined based on the type of data, temperature of the data, and amount/ type/temperature of data and/or media to be converted. Furthermore, the amount of media to convert for each storage device B and C may depend on their respective latency. Accordingly, storage device B may convert more media to enhanced capacity than storage device C because storage device B had a faster 99% latency (80 ms) than the storage device C (100 ms).

A metric may also relate to data temperature. For example, storage devices that store a threshold amount of "cold data" may be selected for media conversion. Cold data is data that is infrequently (or not recently) accessed. Thus, a device storing an amount of cold data may be ideal for media conversion such as to avoid performance degradation. In contrast, a storage device that stores an amount of "hot data," or data that is frequently/recently accessed may be avoided for media conversion. In some implementations, after a media is converted, any cold data may be archived at the converted portion of the storage media, particularly when the converted portion is preferred for cold data storage and not preferred for hot data storage. For instance, cold data may be archived on the media converted to SMR.

In some implementations, the selection of storage devices for conversion may depend on the type of data within each device. For example, boot data or system data may be stored a single storage device. Because of the importance of the boot or system data, such a device may not be converted to a high capacity media. In some implementations, the storage controller 502 or storage manager 504 may store customer specific information. For example, a customer A using the storage system 500 may pay for high performance than another customer B. If a device failure (e.g., defect) occurs in the storage system, then any storage device with the high-performance customer's (customer A) data may not be selected for conversion. Rather, conversion may be directed to devices storing customer B data (e.g., not paying for the higher performance).

The information (e.g., read/write heat, latency, data type) may be logged by the storage devices 506 and communicated to the storage manager 504. The storage manager 504 (or the storage controller 502) may utilize the information to select storage devices for conversion after a defect is detected. Furthermore, read heat/write heat, data heat, etc. may be managed in a heat map, flash translation layer (FTL), etc. The above described selection criteria may be utilized across multiple devices, across a media surface (e.g., on a single disc), on an SSD, or any combination thereof.

If a defect is detected in the storage device 510 that affects only a portion of the storage device 510, then the lost capacity may be accommodated within the storage device 510 itself as described above with respect to FIG. 4. For example, if the storage device 510 detects a defect that cause a 50 GB loss of capacity. Then the storage device 510 may convert a portion of its storage media to an enhanced capacity recording scheme to account for the lost 50 GB of data. Similarly, the capacity lost due to the defect in the portion of the storage device 510 may be allocated across multiple devices.

The mapping schemes described in FIGS. 2-3 may be utilized to map the capacity of the storage system 500. As such, instead of flat LBA map (e.g., the LBAs 508), one set of LBAs may be utilized to map the capacity of the storage system 500 using the conventional recording scheme and another set of LBAs may be utilized to map the capacity of the storage system using the enhanced capacity recording scheme.

A media cache may be designated on one or more of the storage devices 506 for overprovisioning and random write absorption for performance. As such, when media of one or more of the storage devices 506 are selected for conversion, the media caches may be used for a staging area for conversion as well as for absorbing random writes to the converted media. It should be understood that a media cache from a storage device different from the one being converted may be utilized.

Media conversion may be performed when the media is taken off-line, during host idle times, device idle times, etc. In some implementations, media conversion may be amortized over time and performed in steps. In such implementations, a region map may be used to that maps the entire recording space that keeps tracks of offline storage areas that are being converted. In some implementations, a device (e.g., one of the storage device 506), storage controller 502, storage manager 504, etc. may request idle time to perform the conversion operations. A device health log may log triggers of all media conversions, power on hours at which conversions occur, etc. to keep track of the health of the storage system 500. It should be understood that media conversion may alternatively or additionally be performed when the device/media is online and not idle.

Figure 6:
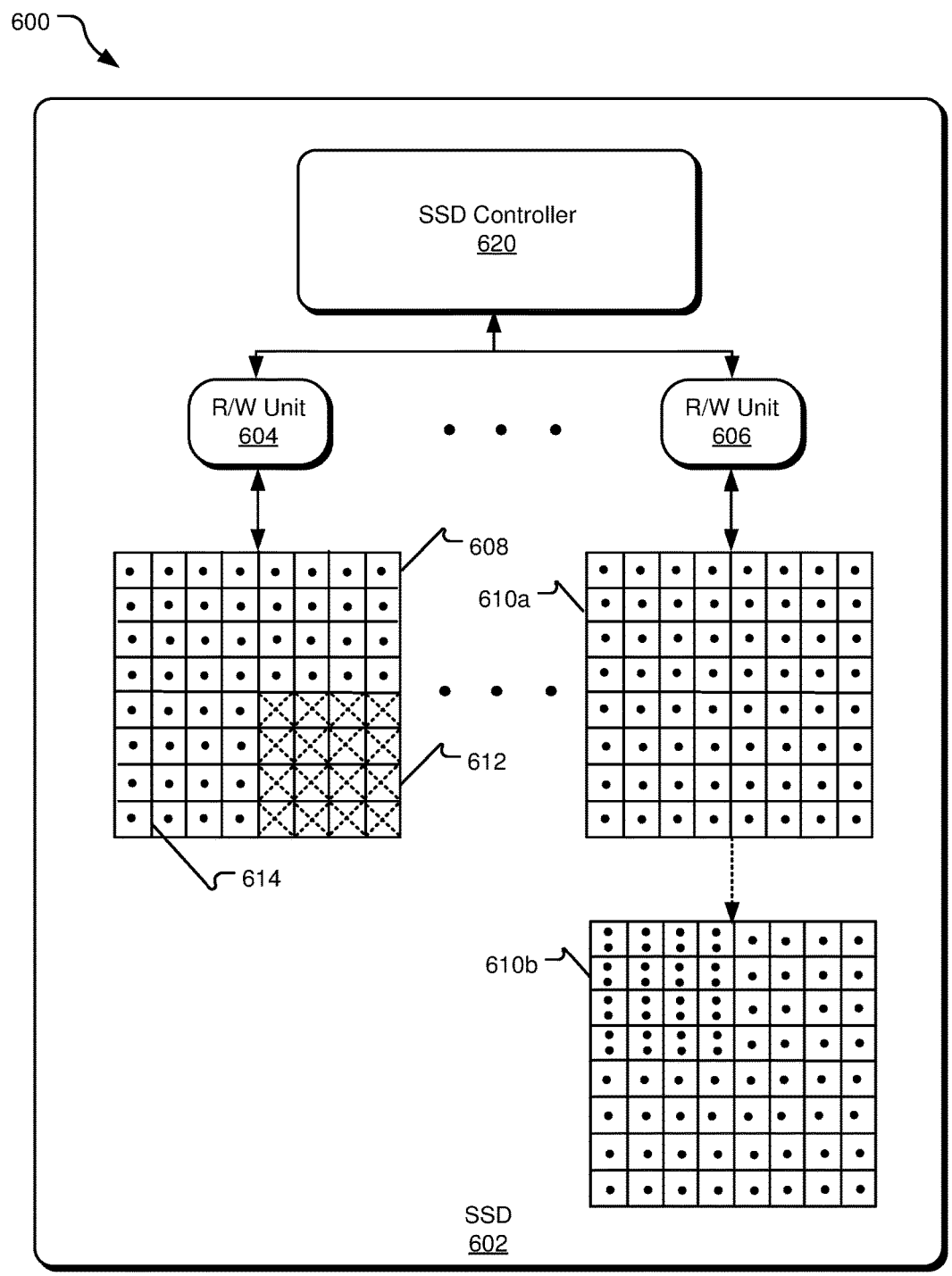
FIG. 6 illustrates another example storage system configured for self-healing.

FIG. 6 illustrates another example storage system 600 configured for self-healing. Specifically, FIG. 6 illustrates a solid-state drive (SSD) 602. The SSD 602 includes a SSD controller 620 that is configured to direct host (not shown) read and write requests to one or more read write units (e.g., a R/W unit 604 and a R/W unit 606) which serve respective memory blocks (e.g., memory blocks 608 and 610). The memory blocks 608 and 610 include a number of cells (e.g., a cell 614) that store bits of user data. The SSD 602 may capable of multi-level cell (MLC) storage, which means that each cell of the memory block 608 and 610 may be used to store more than one bit of data. The number of bits per cell may depend on the "programming mode" of the SSD 602. The programming mode may be controlled by the SSD controller 620 or a host device.

In FIG. 6, a defect 612 is detect that affects a storage capacity of the SSD 602. For example, a plurality of cells may be rendered unusable to store data due to defects in the memory cells. The defects may be due to degradation of the memory cells due to a large amount of reads/writes/erasures directed to such cells, or simply infant mortality. In order to maintain a storage capacity presented to the host, a portion of the memory block 610a is converted from a low capacity recording scheme (e.g., 1 bit per cell) to a higher/enhanced capacity recording scheme (e.g., 2 bits per cell), as illustrated in the memory block 610b. A LBA mapping scheme (as illustrated and described above with respect to FIGS. 1-4) may be utilized to map usable space in the SSD 602. The LBA mapping scheme may utilize 1 or more LBA ranges to map space according to a low capacity scheme and a higher capacity scheme. It should be understood that the media conversion illustrated in FIG. 6 may be utilized in a flash media such as a flash included in a hard disc drive (HDD).

It should be understood that a defect may affect an entire block (e.g., block 608) a portion of a block, a more than one block. It such circumstances, a portion of one or more blocks (e.g., block 610a) may be selected for media conversion to accommodate lost capacity due to the affected block or blocks.

Figure 7:
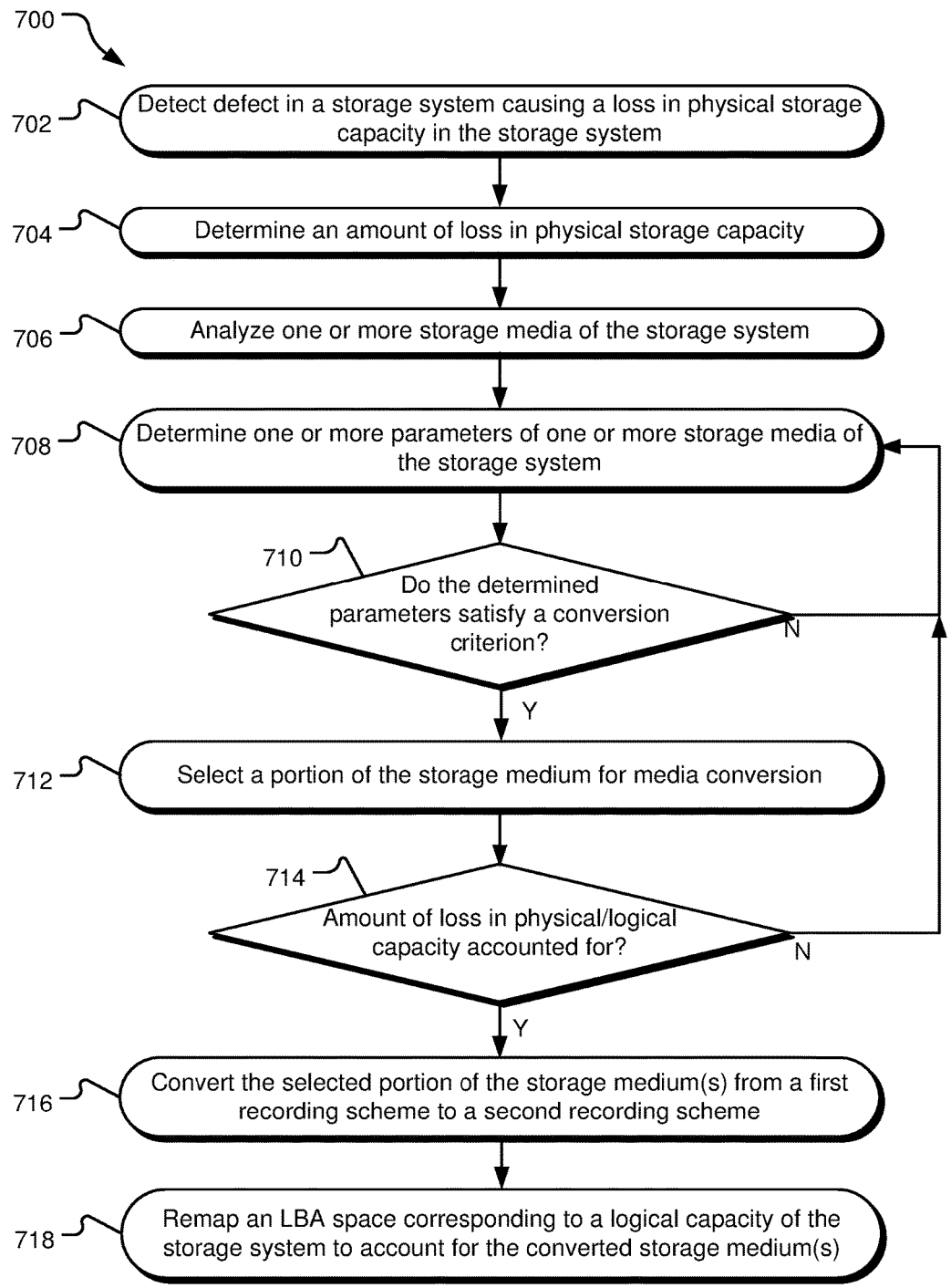
FIG. 7 illustrates example operations for self-healing in a storage system.

FIG. 7 illustrates example operations 700 for self-healing in a storage system. The operations 700 may be performed by one or more storage controllers, managers, etc. which may be embodied in hardware or software and executing processor-executable instructions stored in a storage medium. A detecting operation 702 detects a defect in a storage system causing a loss in physical storage capacity in the storage system. The defect may be the result of unreadable/unrecoverable data, noisy data, etc. in a sector, portion, radial stroke, storage block, etc. of one or more storage media such as one or more magnetic storage discs, SSD blocks, storage devices (e.g., a drive, JBOD). A determining operation 704 determines an amount of loss in physical storage capacity. An analyzing operation 706 analyzes one or more storage media of the storage system. Such analysis may include accessing log files, accessing data heat maps, accessing flash translation layers (FTL), etc.

A determining operation 708 determines one or more parameters of the one or more storage media of the storage system. The parameters may include read heat, write heat, latency, type of data, customer data location, etc. Furthermore, the determining operation 708 may determine one or more conversion criterions (e.g., thresholds) such as latency, read heat, write heat, etc. A determining operation 710 determines whether the determine parameters satisfy a conversion criterion. The conversion criterion may be based on a latency threshold, read/write heat threshold, amount of data/media to convert relative to the amount of data lost, etc. If parameters of a storage medium satisfy a conversion criterion, then a selecting operation 712 selects the storage medium for media conversion. If the parameters do not satisfy a conversion criterion (e.g., write heat is too high), then the process returns to the determining operation 708, which determines the one or more parameters of the one or more storage media of the storage system.

After the selecting operation 712, another determining operation 714 determines whether the amount of loss in the physical/logical capacity due to the defect is accounted for when the selected storage medium(s) are converted. If not, then the process returns to the determining operation 708. If the amount of loss is accounted for, then a converting operation 716 converts the selected storage medium(s) from a first recording scheme to a second recording scheme. The second recording scheme has a substantially higher storage density than the first recording scheme. In some implementations, the first recording scheme is a conventional magnetic recording (CMR) scheme, and the second recording scheme is one of shingled magnetic recording (SMR) and interlaced magnetic recording (IMR). In the same or other implementations, the storage medium is one or more SSD blocks, and the second recording scheme corresponds to more bits per cell than the first recording scheme.

A remapping operation 718 remaps an LBA space corresponding to a logical capacity of the storage system to account for the converted storage medium(s). In some implementations, the LBA space is a flat map, and the mapping operation includes remapping one or more LBAs to the converted physical medium(s). In some implementations, the LBA space is includes a first LBA range directed to the storage media when storing data according to the first recording scheme and a second LBA range directed to the storage media when storing data according to the second recording scheme. In such an implementation, the remapping operation includes the storage controller using the second LBA range after the conversion of the media.

Figure 8:
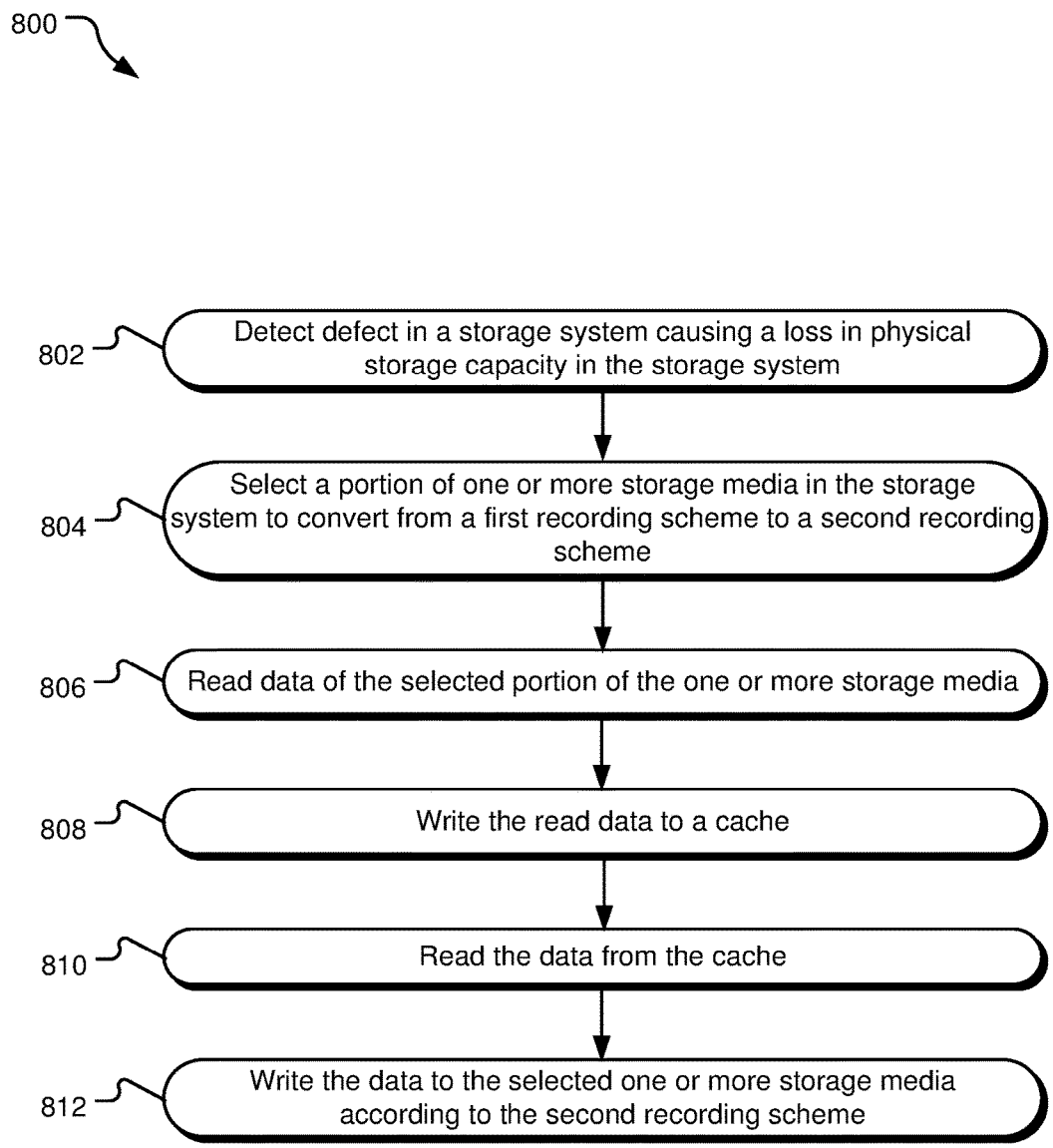
FIG. 8 illustrates example operations for media conversion for self-healing in a storage system.

FIG. 8 illustrates example operations 800 for media conversion for self-healing in a storage system. The operations 800 may be performed by one or more storage controllers, managers, etc. which may be embodied in hardware or software and executing processor-executable instructions stored in a processor-executable storage medium. A detecting operation 802 detects a defect in a storage system causing a loss in physical storage capacity in the storage system. A selecting operation 804 selects a portion one or more storage media in the storage system to convert from a first recording scheme to a second recording scheme. A reading operation 806 reads data of the selected portion of the one or more storage media. A writing operation 808 writes the read data to a cache. The cache may be a media cache on the media being converted, a media cache on a separate storage media, an SSD or other volatile or non-volatile cache, etc. A reading operation 812 reads the data from the cache. A writing operation 812 writes the data to the selected on or more storage media according to the second recording scheme.

The operations 800 may be performed when the media is taken off-line, during host idle times, device idle times, etc. In some implementations, the conversion operations 800 may be amortized over time and performed in steps. In such implementations, a region map may be used to that maps the entire recording space that keeps tracks of offline storage areas that are being converted. In some implementations, a device, storage controller, etc. may request idle time to perform the conversion operations 800.

The above described implementations are described with respect to one or more storage medias (e.g., disc or flash), one or more storage devices (e.g., HDD, SSD, RAID, JBOD), one or more failure domains (e.g., portion of a disc, a disc surface, entire disc, entire device). It should be understood that the self-healing operations and implementations may be implemented in separate storage mediums, across mediums, across devices, etc. Furthermore, mapping schemes may be utilized in separate storage mediums, across mediums, across devices, etc.

Figure 9:
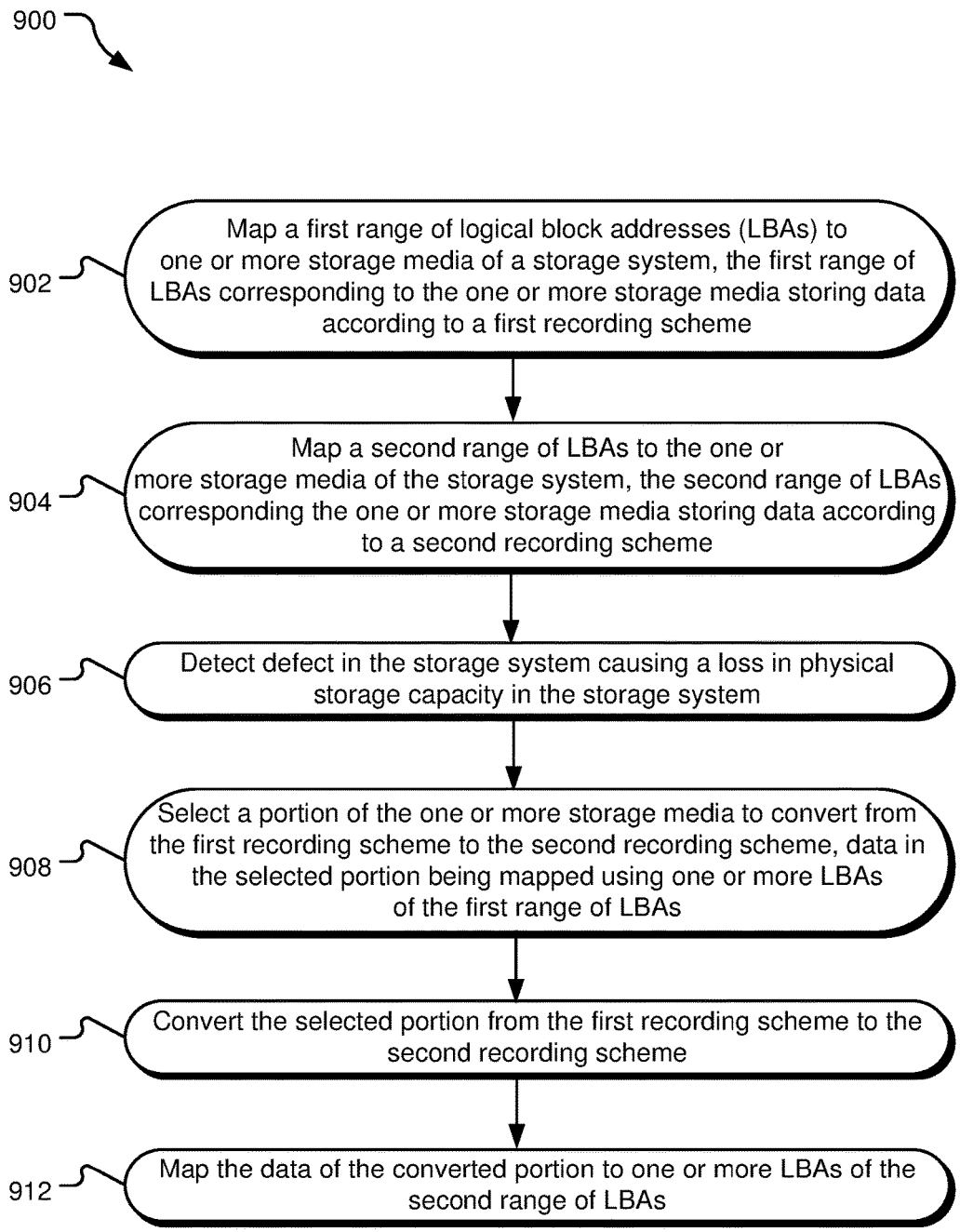
FIG. 9 illustrates example operations for utilizing a mapping scheme for media conversion.

FIG. 9 illustrates example operations 900 for utilizing a mapping scheme for media conversion. A mapping operation 900 maps a first range of logical block addresses (LBAs) to one or more storage media of a storage system. The first range of LBAs correspond to the one or more storage media storing data according to the first recording scheme. In other words, the first LBAs represent the storage capacity of the storage system when storing data according to the first recording scheme. A second mapping operation 904 maps a second range of LBAs to the one or more storage media of the storage system. The second range of LBAs correspond to the one or more storage media storing data according to a second recording scheme. In implementations where the second recording scheme stores data at higher storage density than the first recording scheme, the second range of LBAs represents a larger storage capacity of the storage system than the first recording scheme. For example, if the one or more storage media store 10 TB of data when data is stored according to the first recording scheme, the one or more storage media may store 12 TB when data is stored according to the second recording scheme. The corresponding LBA ranges represent the difference in storage capacity.

Furthermore, a portion of the storage media may have a corresponding LBA in the first range representing the portion storing data according the first recording scheme and a corresponding LBA in the second range of LBAs representing the portion storing data according to the second recording scheme. When data is stored in the portion according to the first recording scheme, the corresponding LBA in the first range of LBAs is utilized to read or rewrite such data. When data is stored in the portion according to the second recording scheme, the corresponding LBA in the second range of BLAs is utilized to read or rewrite such data. It should be understood that the mapping scheme described above may be utilized without regard to detection of a defect or self-healing. In other words, the mapping scheme may be utilized in any storage system storing data according to two or more recording schemes.

A detecting operation 906 detects a defect in the storage system causing a loss in physical storage capacity in the storage system. A selecting operation 908 selects a portion of the one or more storage media to convert form the first recording scheme to the second recording scheme. Data in the selected portion is mapped using one or more LBAs of the first range of LBAs. A converting operation 910 converts the selection portion from the first recording scheme to the second recording scheme. A mapping operation 910 maps the data of the converted portion to one or more LBAs of the second range of LBAs. Accordingly, when one or more read/writes are directed to the converted portion, the one or more LBAs mapped to such portions are utilized. The operations 900 and the mapping scheme described may be managed by a storage controller, storage manager, etc.

Figure 10:
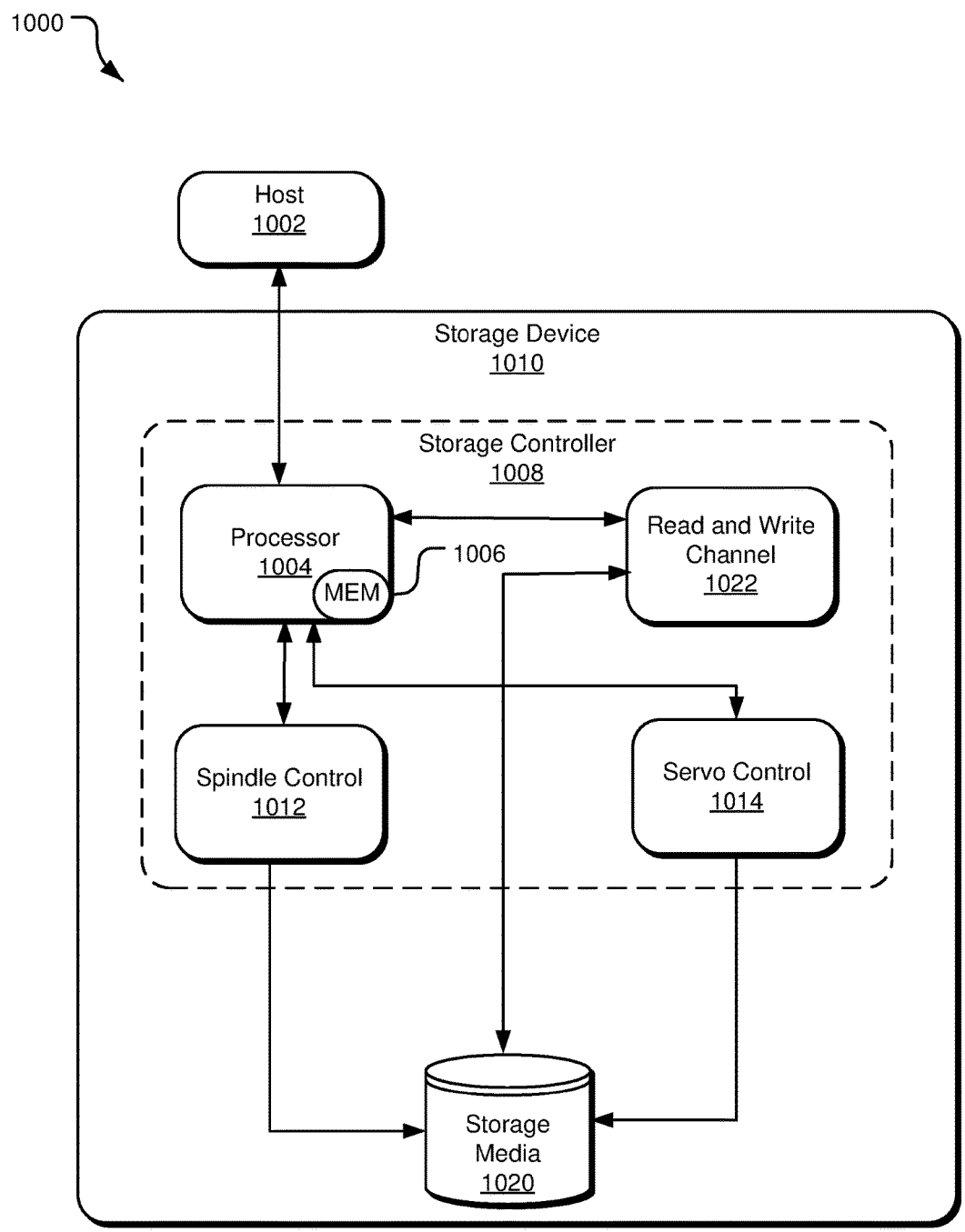
FIG. 10 illustrates an example schematic of a storage controller of a storage device.

FIG. 10 illustrates an example schematic 1000 of a storage controller 1008 of a storage device 1010. Specifically, FIG. 10 shows one or more functional circuits that are resident on a printed circuit board used to control the operation of the storage device. The storage controller 1008 is operably and communicatively connected to a host computer 1002. Control communication paths are provided between the host computer 1002 and a processor 1004. Control communication paths are provided between the processor 1004 and the storage media 1020 via a number of read/write channels (e.g., read and write channel 1022). The processor 1004 generally provides top-level communication and control for the controller 1008 in conjunction with processor readable instructions for the processor 1004 encoded in processor readable storage media 1006. The processor readable instructions comprise instructions for controlling writing to and reading from data sectors on a storage media 1020. The processor readable instructions further include instructions for self-healing in the storage media 1020 and instructions for determining defects, writing data using one or more recording schemes (e.g., CMR, SMR, IMR), storing or maintaining LBA space, converting between LBA ranges, determining/tracking latency, read heat, write heat, determining amount of media to select for media conversion, etc.

The term "processor readable storage media" includes but is not limited to, random access memory ("RAM"), ROM, EEPROM, flash memory or other memory technology, CDROM, digital versatile discs (DVD) or other optical disc storage, magnetic cassettes, magnetic tape, magnetic disc storage or other magnetic storage devices, or any other tangible medium which can be used to store the desired information and which can be accessed by a processor. In contrast to tangible processor-readable storage media, intangible processor-readable communication signals may embody processor readable instructions, data structures, program modules or other data resident in a modulated data signal, such as a carrier wave or other signal transport mechanism. Note that while, the system for management of system files on a storage device is disclosed herein in context of an HDD, one or more aspects the technology disclosed herein may also be applicable to other storage devices enumerated above.

The storage controller 1008 controls storage of data on the storage media 1020 such as magnetic disc, optical discs, etc. A spindle motor control circuit 1012 controls the rotation of storage media 1020. A servo circuit 1014 provides control for moving an actuator that moves heads (not shown) between tracks on the storage media 1020 and controls the position of the head.

Other configurations of storage controller 1008 are contemplated. For example, storage controller 1008 may include one or more of an interface circuitry, a buffer, a disc drive, associated device peripheral hardware, an encryption unit, a compression unit etc. The processor readable instructions may be included on the host computer 1002 or the storage device 1010 (e.g., the memory 1006).

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disc media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
   detecting a defect in a storage system causing a loss in physical storage capacity of the storage system, the storage system including a storage media storing data according to a first recording scheme; and
   responsive to detecting the defect, converting at least a portion of the storage media to store data according to a second recording scheme, the second recording scheme storing data at a substantially higher storage density than a storage density of the first recording scheme.

2. The method of claim 1 wherein the storage system is characterized by a logical storage capacity and converting at least the portion of the storage media to store data according to the second recording scheme further comprises selecting a size of the portion of the storage media and the second recording scheme to substantially maintain the logical storage capacity of the storage system.

3. The method of claim 1 wherein the storage media is at least one magnetic disc and the first recording scheme is a conventional magnetic recording (CMR) scheme and the second recording scheme is one of shingled magnetic recording (SMR) and interlaced magnetic recording (IMR).

4. The method of claim 1 wherein the storage system includes a plurality of disc drives, the defect causing the loss in physical storage capacity in at least a first disc drive of the plurality of disc drives and the converting operation further comprises:
   rewriting at least a portion of a second disc drive of the plurality of disc drives using the second recording scheme.

5. The method of claim 1 wherein the storage system includes an SSD wherein the converting operation further comprises:
   rewriting at least a block of the SSD using the second recording scheme, the second recording scheme utilizing more bits per cell in the block compared to the first recording scheme.

6. The method of claim 1 further comprising:
   determining latency in one or more storage media of the storage system; and
   selecting the portion of the storage media to store data according to the second recording scheme based on the determined latency.

7. The method of claim 1, further comprising:
   determining at least one of read heat and write heat of data in the storage media; and
   selecting the portion of the storage media to store data according to the second recording scheme based on the determined read heat or write heat.

8. The method of claim 1 wherein a logical storage capacity of the storage system corresponds to a plurality of logical block addresses (LBAs), the method further comprising:
   remapping at least one of the plurality of LBAs to account for the converted portion of the storage media.

9. The method of claim 1 wherein a first plurality of logical block addresses (LBAs) correspond to a logical capacity of the storage media storing data according to the first recording scheme and a second plurality of logical block addresses (LBAs) correspond to the storage media storing data according to the second recording scheme.

10. One or more tangible processor-readable storage media encoding processor-executable instructions for executing on a computer system a computer process, the computer process comprising:
    detecting a defect in a storage system causing a loss in physical storage capacity of the storage system, the storage system including a storage media storing data according to a first recording scheme; and
    responsive to detecting the defect, converting at least a portion of the storage media to store data according to a second recording scheme, the second recording scheme storing data at a substantially higher storage density than a storage density of the first recording scheme.

11. The one or more tangible processor-readable storage media of claim 10 wherein the storage system is characterized by a logical storage capacity and converting at least the portion of the storage media to the second recording scheme further comprises selecting a size of the portion of the storage media and the second recording scheme to substantially maintain the logical storage capacity of the storage system.

12. The one or more tangible processor-readable storage media of claim 10 wherein the storage media is at least one magnetic disc and the first recording scheme is a conventional magnetic recording (CMR) scheme and the second recording scheme is one of shingled magnetic recording (SMR) and interlaced magnetic recording (IMR).

13. The one or more tangible processor-readable storage media of claim 10 wherein the storage system includes a plurality of disc drives, the defect causing the loss in physical storage capacity in at least a first disc drive of the plurality of disc drives and the converting operation further comprises:
    rewriting at least a portion a second disc drive of the plurality of disc drives using the second recording scheme.

14. The one or more tangible processor-readable storage media of claim 10 wherein the storage system includes an SSD wherein the converting operation further comprises:
    rewriting at least a block of the SSD using the second recording scheme, the second recording scheme utilizing more bits per cell in the block compared to the first recording scheme.

15. The one or more tangible processor-readable storage media of claim 10 further comprising:
    determining latency in one or more storage media of the storage system; and
    selecting the portion of the storage media to store data according to the second recording scheme based on the determined latency.

16. The one or more tangible processor-readable storage media of claim 10 further comprising:
    determining at least one of read heat and write heat of data in the storage media; and
    selecting the portion of the storage media to store data according to the second recording scheme based on the determined read heat or write heat.

17. The one or more tangible processor-readable storage media of claim 10 wherein a logical storage capacity corresponds to plurality of logical block addresses (LBAs), the process further comprising:
    remapping at least one of the plurality of LBAs to account for the converted portion of the storage media.

18. The one or more tangible processor-readable storage media of claim 10 wherein a first plurality of logical block addresses (LBAs) correspond to a logical capacity of the storage media storing data according to the first recording scheme and a second plurality of logical block addresses (LBAs) correspond to the storage media storing data according to the second recording scheme.

19. A storage system comprising:
at least one storage medium storing data according to a first recording scheme; and
a storage controller configured to:
  detect a defect in the storage system causing a loss in physical storage capacity of the storage system; and
  responsive to detecting the defect, converting at least a portion of the at least one storage medium to store data according to a second recording scheme, the second recording scheme storing data at a substantially higher storage density than a storage density of the first recording scheme.

20. The storage system of claim 19 wherein the storage medium is a magnetic disc and the first recording scheme is a conventional magnetic recording (CMR) scheme and the second recording scheme is one of shingled magnetic recording (SMR) and interlaced magnetic recording (IMR).

* * * * *